July 16, 1929.  J. D. MACRAE ET AL  1,721,347
LAMP FOR VEHICLES
Filed Dec. 6, 1927
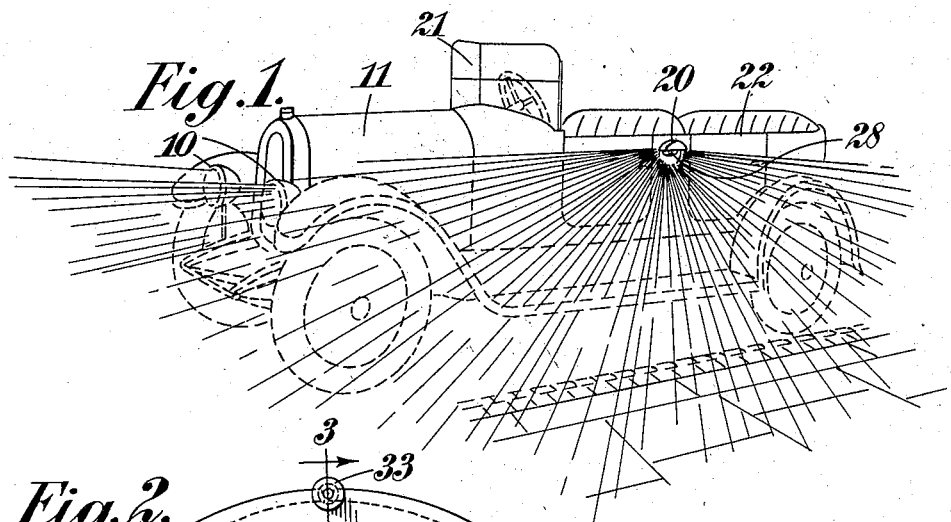
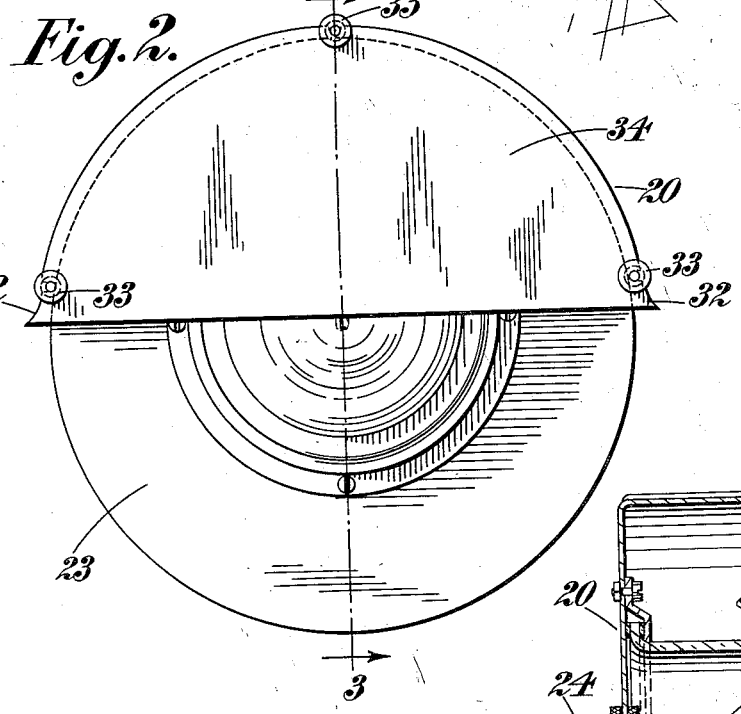
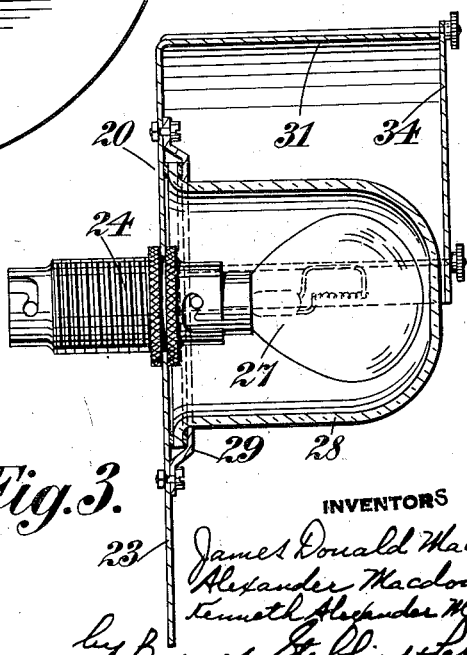
INVENTORS
James Donald Macrae
Alexander Macdonald
Kenneth Alexander Macrae
by Byrnes, Stebbins & Parmelee
their attorneys Patented July 16, 1929.

1,721,347

UNITED STATES PATENT OFFICE.

JAMES DONALD MACRAE, ALEXANDER MACDONALD, AND KENNETH ALEXANDER MACRAE, OF BONAR-BRIDGE, SCOTLAND.

LAMP FOR VEHICLES.

Application filed December 6, 1927, Serial No. 238,122, and in Great Britain March 21, 1927.

This invention is for improvements in or relating to lamps for vehicles so arranged as to reduce or eliminate the annoyance caused by glare or dazzle of the brilliant headlights of vehicles to the drivers of approaching vehicles and others, such as pedestrians. The type of lighting system to which the invention relates is that wherein one or more external auxiliary lamps provided in addition to the main headlights, are arranged to throw one or more beams of light downwards to one or both sides of the direction of travel of the vehicle.

In lighting systems of the type described, proposed heretofore, the external auxiliary lamps have constituted spot lights which could be turned in various directions for examining different parts of the vehicle, such as the tires, and for illuminating the curbstone on a foggy night; also they have been arranged at the rear of the vehicle out of sight from the front, and used, to the exclusion of the main headlights, on the approach of another vehicle, for illuminating the road on one or both sides of the vehicle, but this arrangement necessitated the extinguishing of the headlights by the driver of the vehicle.

This invention has for one of its objects to provide an improved lighting system of the type described, wherein the auxiliary lamp or lamps are so arranged that although the illumination of the headlights is not reduced or extinguished, the annoyance caused by glare or dazzle is diminished or eliminated by doing away with the effect of a bright light or lights concentrated at a point or points viewed against a deep black background, which effect is believed to be the chief cause of the trouble referred to.

According to an important feature of the invention, there is provided the combination with a vehicle, such as a motor vehicle, having one or more headlights of the brilliant type, of an auxiliary lamp or lamps to be operative whilst the headlights are also fully operative, which auxiliary lamp or lamps are so arranged on one or both sides of the body of the vehicle at the rear of the headlights that, when operative, they each illuminate a background constituted by substantially the whole of one side of the vehicle, and the road at the side of the vehicle, situated behind the headlights and thereby reduce the contrast between the brilliant light of the headlights and the dark background which would otherwise exist, the source or sources of light of which auxiliary lamp or lamps are so arranged as to be invisible from in front of the vehicle by the driver of an approaching vehicle and also from the side of the vehicle by pedestrians, which auxiliary lamp or lamps provide each a beam having a wide angle fore-and-aft of the vehicle and in a direction laterally thereof.

Preferably, the said auxiliary lamp or lamps are arranged between the windscreen and the rear end of the vehicle.

The invention further provides for use on a vehicle as described above, a specific construction of auxiliary lamp as described hereinafter.

In order that the invention may be more clearly understood reference will be made to the accompanying drawing showing one form of lighting system for vehicles according to the invention. In said drawing:—

Figure 1 is a perspective view of a motor vehicle having headlights of the brilliant type and an auxiliary lamp arranged according to the invention, Figure 2 is a side elevation showing the auxiliary lamp on a scale larger than that of Figure 1, and Figure 3 is a vertical section taken on the line 3—3 in Figure 2.

Like reference numerals designate like parts throughout the several views.

Referring to the drawing, a motor vehicle is provided in front as usual with headlamps 10 of the brilliant type, one at each side of the bonnet 11 of the engine. In some cases, however, only one such headlight may be provided, for example centrally in front of the radiator. When such lamps are illuminated the driver of an approaching vehicle or a pedestrian in front of the lamps sees a brilliant light or lights concentrated at a point or points against a dark background. It has been found by experiment and practical tests that it is this contrast between a bright light and a deep black or relatively dark background that is particularly annoying, and that if the same bright light is viewed against a background that is illuminated even only slightly, as by a diffused light, very little or no distress is caused to the eyes of a person viewing the bright light. The background of the headlights of a travelling vehicle is constituted in part by the road on which the vehicle is travelling and in part by the body and other parts of the vehicle. To illuminate the roadway alone at the sides of the vehicle would not be sufficient to provide such an illuminated background, because, as viewed by the driver of an approaching vehicle, it would lie wholly below his normal line of sight approximately level with the headlights. It is necessary also to illuminate some part of the vehicle so situated behind the headlights that when illuminated it forms, together with the illuminated roadway, an illuminated background situated behind the headlights so as to reduce the contrast between the brilliant light of the headlights and the dark background which would otherwise exist.

As illustrated, an auxiliary lamp 20, which may emit a light as brilliant as that of one of the headlamps 10 is so arranged on the outside of one side of the body of the vehicle that, when operative, it projects a beam of such intensity and so widely dispersed as to illuminate the side of the vehicle substantially from end to end and also the roadway at the same side of the vehicle. The lamp 20 is shown mounted between the windscreen 21 and the rear end of the vehicle body slightly below the level 22 of the top of the doors of the vehicle, but it may be fixed at some other convenient situation, for example a little higher or lower than as shown, or further towards the rear of the vehicle, for example above the rear mudguard, or at or about the level of the top of the roof of a vehicle having a "saloon" body.

A second auxiliary lamp, such as 20, may be provided similarly at the other side of the vehicle for simultaneously illuminating both sides of the vehicle and also the roadway at both sides thereof.

As shown in Figures 2 and 3, the auxiliary lamp 20 comprises a circular reflecting base plate 23 provided with a screw-threaded tubular stem 24 which can extend through a hole in the body of the vehicle and be secured in position by a nut on its inner end. This stem 24 constitutes part of a lamp-holder that carries at its outer end an electric lamp bulb 27 which is enclosed by a glass 28 in the form of a bell jar detachably secured in position by a metal ring 29 on the base plate 23. The inner end of the stem 24 constitutes a bayonet holder for a plug for detachably connecting a source of current with the lamp 27. A semi-cylindrical screen 31 having a reflecting inner face is so arranged on the base plate 23 above the lamp as to reflect the light fore-and-aft of the vehicle body and downwards. In order to prevent rays of light from this lamp from annoying the driver of an oncoming vehicle the lower edges 32 of the screen 31 are so placed with respect to the lamp bulb 27 as to cut off such rays; as illustrated, these edges 32 are substantially level with the lamp filament and are curved slightly outwards. The screen 31 extends beyond the outer end of the glass 28 and carries, preferably detachably, by means of nuts 33 a semi-circular obturator 34 at the side of the bulb 27 remote from the vehicle for cutting off lateral rays from the lamp above the level of the bulb, in order to prevent such rays from inconveniencing pedestrians at the side of the road on a level with the vehicle, or drivers of passing vehicles.

This auxiliary lamp is preferably fixed at least fourteen inches above the level of the highest parts of the front and rear mudguards of the vehicle so that the latter are clearly illuminated when the lamp is lit. In order to enhance the illuminated effect both mudguards and the side of the body of the vehicle including its one or more doors may be finished with a reflecting surface, for example like that of polished aluminium.

The described auxiliary lamp with the diffused light it provides will illuminate the whole side of the vehicle from the front to the extreme rear. It will also illuminate the road adjacent to the vehicle. By thus illuminating the whole side of the vehicle and the roadway contiguous thereto it will prevent the "dazzle" caused when two motor vehicles with brilliant headlights approach each other in the dark. Drivers of such vehicles can drive up to meet each other with complete confidence as the nearer they approach each other the less the "dazzle" becomes, so that, when within a few yards of each other, each driver can see the whole of the approaching vehicle and the adjacent roadway, and they can pass each other almost as easily as they can during daylight. The reason for this desirable result is believed to be that the diffused light at the sides of the vehicle eliminates the otherwise black background behind the headlamps and thus does away with the glare or dazzle effect. Pedestrians are likewise protected from "dazzle" if both sides of the vehicle are fitted each with an auxiliary lamp as described above. For the convenient and safe passing of vehicles alone one auxiliary lamp on that side of the vehicle at which a passing vehicle travels will be sufficient.

Various modifications may be made in the details of construction of lighting system described above without departing from the scope of the invention as defined in the claims. For example, one or both of the auxiliary lamps may be made readily detachable from the body of the vehicle to be used as inspection lamps for any desired purpose, for example examining the engine or removing a wheel or changing a rim. Also, two electric lamp bulbs or two separate filaments in one such bulb may be provided in one auxiliary lamp for enabling one such bulb or filament to be used as a "parking" lamp.

We claim:

1. A side lamp for a vehicle having a source of light in the form of the filament of an electric bulb and above the latter a semi-cylindrical reflector which is arranged to reflect the light fore-and-aft of the vehicle and downwards, and which has its lower edges level with or below the source of light, and a semi-circular obturator is detachably provided on the end of the reflector at the side of the source of light remote from the vehicle, which auxiliary lamp is so arranged on one side of the body of the vehicle at the rear of the headlight that, when operative it will illuminate a background constituted by substantially the whole of the side of the vehicle on which it is arranged, and the road at the same side of the vehicle situated behind the headlight and thereby reduce the contrast between the brilliant light of the headlight and the dark background which would otherwise exist, which auxiliary lamp provides a beam having a wide angle fore-and-aft of the vehicle and in a direction laterally thereof, whereby the source of light of the auxiliary lamp will be invisible to the driver of an approaching vehicle and also from the side of the vehicle, to pedestrians.

2. A side lamp for a vehicle having an upstanding flat reflecting base-plate to be mounted on the side of the vehicle, a source of light in front of the latter in the form of the filament of an electric bulb, a globe mounted on the base-plate and enclosing the said bulb, and above the latter a semi-cylindrical reflector which is arranged to reflect the light fore-and-aft of the vehicle and downwards, and which has its lower edges outwardly curved and situated level with or below the source of light, and a semi-circular obturator detachably mounted on the end of the said reflector at the side of the source of light remote from the base-plate.

3. A side lamp for a vehicle having a reflecting base-plate, a threaded tubular stem extending laterally therefrom and arranged to extend through a hole in the body of the vehicle, a nut for securing the stem and base-plate in position on the body of the vehicle, means for connecting an electric bulb to the stem at one end, means for connecting a plug at the other end, and a curved screen connected to the reflecting base-plate and partially covering the bulb when positioned in the stem.

In testimony whereof we have signed our names to this specification.

JAMES DONALD MACRAE.
ALEXANDER MACDONALD.
KENNETH ALEXANDER MACRAE.